(12) United States Patent
Raute et al.

(10) Patent No.: US 11,005,394 B2
(45) Date of Patent: May 11, 2021

(54) CONTROL SYSTEM AND CONTROL METHOD

(71) Applicant: Carlo Gavazzi Services AG, Steinhausen (CH)

(72) Inventors: Reiko Raute, Zabbar (MT); Roger Galea, Luqa (MT); Johann Galea, Pietà (MT); Jason Demicoli, Marsascala (MT)

(73) Assignee: CARLO GAVAZZI SERVICES AG, Steinhausen (CH)

( * ) Notice: Subject to any disclaimer, the term of this patent is extended or adjusted under 35 U.S.C. 154(b) by 41 days.

(21) Appl. No.: 16/155,312

(22) Filed: Oct. 9, 2018

(65) Prior Publication Data
US 2019/0109548 A1   Apr. 11, 2019

(30) Foreign Application Priority Data

Oct. 11, 2017  (EP) ..................................... 17195903

(51) Int. Cl.
*H02P 1/42* (2006.01)
*H02P 1/12* (2006.01)

(52) U.S. Cl.
CPC ................ *H02P 1/423* (2013.01); *H02P 1/12* (2013.01); *H02P 1/42* (2013.01); *H02P 2201/11* (2013.01)

(58) Field of Classification Search
CPC ...................................... H02P 1/12; H02P 1/42
See application file for complete search history.

(56) References Cited

U.S. PATENT DOCUMENTS

| 5,483,139 A | * | 1/1996 | Welles, II | ............... H02H 7/085 318/782 |
| 2012/0001577 A1 | * | 1/2012 | Furuta | ...................... B23H 7/14 318/436 |

(Continued)

FOREIGN PATENT DOCUMENTS

EP    2061144 A1    5/2009

OTHER PUBLICATIONS

V. Thanyaphirak, V. Kinnares and A. Kunakorn, "Soft starting control of single-phase induction motor using PWM AC Chopper control technique," 2013 International Conference on Electrical Machines and Systems (ICEMS), Busan, 2013, pp. 1996-1999 (Year: 2013).*

(Continued)

*Primary Examiner* — Said Bouziane
(74) *Attorney, Agent, or Firm* — McDonnell Boehnen Hulbert & Berghoff LLP

(57) ABSTRACT

The present invention provides a control system (100, 200, 300) for controlling a single phase induction motor (150, 250) with a main winding (151, 251) and with an auxiliary winding (152, 252), the control system (100, 200, 300) comprising a first bidirectional switching element (101) and a second bidirectional switching element (102), wherein the first bidirectional switching element (101) is arranged between a phase supply input (103, 203) of the single phase induction motor (150, 250) and the main winding (151, 251) and wherein the second bidirectional switching element (102) is arranged electrically parallel to the main winding (151, 251), and a control unit (105, 205) coupled to the first bidirectional switching element (101) and the second bidirectional switching element (102).

14 Claims, 6 Drawing Sheets

(56) References Cited

U.S. PATENT DOCUMENTS

2015/0333689 A1* 11/2015 Kudoh .................. H02M 5/293
    318/800
2018/0269810 A1* 9/2018 Chretien ................ H02P 1/445

OTHER PUBLICATIONS

D. Yildirim and M. Bilgic, "PWM AC chopper control of single-phase induction motor for variable-speed fan application," 2008 34th Annual Conference of IEEE Industrial Electronics, Orlando, FL, 2008, pp. 1337-1342. (Year: 2008).*

European Search Report for 17195903.4, dated Apr. 18, 2018.

Thankyaphirak, et al., "Soft starting control of single-phase induction motor using PWM AC Chopper control technique," Oct. 2013 International Conference of Electrical Machines and Systems, pp. 1996-1999.

Yildirim, et al., "PWM AC Chopper control of single-phase inductoin motor for variable-speed fan application," Industrial Electronics, 2008, IECON 34th Annual Conference of IEEE, Nov. 2008, pp. 1337-1342.

\* cited by examiner providing in an alternating manner
a positive current and
a freewheeling current path during
a positive half-wave of a supply voltage — S1

↓ providing in an alternating manner
a negative current and
a freewheeling current path during
a negative half-wave of a supply voltage — S2

Fig. 2

CONTROL SYSTEM AND CONTROL METHOD

CROSS REFERENCE

This application claims priority to European patent application serial number 17 195 903.4 filed Oct. 11, 2017, incorporated by reference herein in its entirety.

TECHNICAL FIELD

The invention relates to a control system for controlling a single phase induction motor. Further, the invention relates to a respective control method.

BACKGROUND

Although applicable to any electric motor, the present invention will mainly be described in conjunction with single phase induction motors.

There exist various types of electric motors. A commonly used type of electric motor is for example the single phase induction motor. Such electric motors require only a single phase of AC supply voltage to provide a rotational movement on the shaft of the motor. Further, such motors comprise mechanically simple arrangements. Single phase induction motors are therefore used in a plurality of applications, like white goods, compressors of e.g. air conditioning devices or the like.

Since only a single-phase AC supply voltage is provided to single phase induction motors, these motors usually comprise a main winding and a smaller auxiliary winding. While the main winding is supplied with the unmodified single-phase AC supply voltage, the auxiliary winding is supplied with a delayed supply voltage. For example a capacitor may be provided in the supply line of the auxiliary winding to delay the AC supply voltage for the auxiliary winding.

To start certain motors (e.g. compressor motors) a sufficient starting torque may be required. To increase the starting torque an additional start capacitor may be provided. Such motors may be called CSCR (Capacitor Start Capacitor Run) single phase motors with start capacitor. However, a high starting torque usually also requires or causes a high inrush current.

Accordingly, there is a need for reducing the inrush current in electric motors during start of the electric motor.

SUMMARY OF THE INVENTION

The present invention provides a control system with the features of claim 1 and a control method with the features of claim 10.

Accordingly, there is provided:

A control system for controlling a single phase induction motor with a main winding and with an auxiliary winding, the control system comprising a first bidirectional switching element and a second bidirectional switching element, wherein the first bidirectional switching element is arranged between a phase supply input of the single phase induction motor and the main winding and wherein the second bidirectional switching element is arranged electrically parallel to the main winding, a control unit coupled to the first bidirectional switching element and the second bidirectional switching element, wherein the control unit is configured to control in an alternating manner during a positive half-wave of a supply voltage of the single phase induction motor the first bidirectional switching element to provide a positive current to the main winding and the second bidirectional switching element to provide a freewheeling current path for the positive current through the main winding, and wherein the control unit is configured to control in an alternating manner during a negative half-wave of a supply voltage of the single phase induction motor the first bidirectional switching element to provide a negative current to the main winding and the second bidirectional switching element to provide a freewheeling current path for the negative current through the main winding.

The present invention is based on the finding, that the starting torque produced by a single phase induction motor is mainly influenced by the current through the main winding of the single phase induction motor. The present invention therefore aims at providing a high current in the main winding while at the same time reducing the inrush current to the single phase induction motor during start of the single phase induction motor.

To this end the present invention provides controllable switches in the supply line of the main winding of the single phase induction motor and in parallel to the main winding. The switches may be controlled in an alternating manner during the single half-waves of the single phase AC supply voltage that is provided to the single phase induction motor.

By cutting the supply line with the first bidirectional switching element and providing a freewheeling path for the current through the main winding with the second bidirectional switching element, the control system provides a buck converter like arrangement.

A buck converter, also called step-down converter, is a power converter which steps down voltage while at the same time stepping up current from its input to its output, i.e. a load. It is understood, that although the described arrangement does not comprise an explicit load, the main winding may be seen as the inductor of the buck converter and the load at the same time.

While the supply line is closed through the first bidirectional switching element, the current through the main winding will begin to increase, and the main inductor will produce an opposing voltage across its terminals in response to the changing current. This voltage drop counteracts the voltage of the source and therefore reduces the voltage across the load, in this case the main winding itself. During this time, the main winding stores energy in the form of a magnetic field.

When the supply line is then cut by the first switching element the supply voltage will be removed from the circuit, and the current through the main winding will decrease. The main winding acting as inductor of the buck converter arrangement will produce a voltage across the inductor, and now the main winding will become a current source. By closing the second bidirectional switching element, the energy stored in the magnetic field of the main winding may discharge as a current in the freewheeling current path while no current is consumed from the source that provides the single phase AC supply voltage.

The details of the switching cycle that is used by the control unit may vary according to the application in which the control system is used. For example the switching frequency may e.g. be between 20 kHz and 100 kHz, e.g. 30 kHz, 40 kHz, 50 kHz or more. However, any other adequate switching frequency may be used. The durations of the switching on of the first and the second bidirectional switching element may be fixed, e.g. 30%, 40%, 50%, 60%, or may be controlled by a PWM scheme as will be detailed below.

The arrangement of the present invention, by alternatingly actuating the first and second bidirectional switching elements, reduces the inrush current at the input of the control circuit, while at the same time increasing the current through the main winding of the single phase induction motor.

The present invention therefore provides a large motor starting torque and at the same time a high starting current reduction at the supply input. Further, with the arrangement of the present invention, the starting capacitor may be omitted while the high starting torque is provided.

Common CSCR designs inherently require a start capacitor to generate the initial torque. The present invention in contrast allows starting Capacitor start Capacitor Run (CSCR) without the need of the start capacitor.

Further embodiments of the present invention are subject of the further subclaims and of the following description, referring to the drawings.

In an embodiment, the control system may comprise an input filter circuit arranged between the phase supply input of the single phase induction motor and a neutral input of the single phase induction motor.

The input filter circuit may e.g. be an LC filter that comprises an inductor in the supply line and a capacitor between the supply line and the neutral input. It is understood, that this arrangement is just exemplarily mentioned and that any other adequate filter arrangement may be used.

With the input filter circuit the high switching harmonics caused by switching the first and second bidirectional switching elements are filtered out and the peak amplitude, which is the peak amplitude of the main winding current, is not propagated to the source of the AC supply voltage.

In an embodiment, the control system may comprise a bypass switching element arranged between the phase supply input and the main winding.

The bypass switching element serves for bypassing the first bidirectional switching element. This means that the phase supply input may be connected directly to a terminal of the main winding via the bypass switching element.

After starting the single phase induction motor, i.e. when the single phase induction motor reaches a settled or running state, it is not necessary any more to further increase the current through the main winding while reducing the inrush current. Therefore, for maximizing efficiency during normal operation, the buck converter arrangement is bypassed and the main winding is used like a standard main winding of a single phase induction motor.

In an embodiment, the control system may comprise a running capacitor arranged between the phase supply input and the auxiliary winding.

The running capacitor delays the phase of the single phase AC supply voltage through the auxiliary winding and therefore the build-up of the magnetic field in the auxiliary winding. Usually the auxiliary winding and the main winding will be arranged mechanically in a predefined angle, e.g. 90°, to each other. Therefore, by providing the auxiliary winding with a voltage that is delayed with respect to the voltage that is provided to the main winding, a rotating magnetic field may be generated in the single phase induction motor.

In an embodiment, the first bidirectional switching element may comprise two switching elements arranged in common emitter connection or common collector connection, and/or the second bidirectional switching element may comprise two switching elements arranged in common emitter connection or common collector connection. As an alternative the first bidirectional switching element may comprise two parallel reverse blocking transistors, and/or the second bidirectional switching element may comprise two parallel reverse blocking transistors.

The switching elements may e.g. comprise IGBTs, MOSFETs or the like. Common emitter connection in this regard refers to the emitters of the switching elements being connected to each other. The bases of the switching elements are the control inputs that may be driven by the control unit and the collectors of the switching elements are connected to the respective lines of the control system. The reverse blocking transistors may e.g. be reverse blocking IGBTs or MOSFETs or any other type of reverse blocking switch. It is understood, that any switching element that allows controllably switching the electric current in either one of two directions may be used with the present invention.

The bidirectional switching elements therefore comprise four terminals, the two collector terminals that provide the power connectors, and the two base terminals that provide the control inputs.

It is understood, that when transistors like IGBTs are used with opposite polarity, for every half-wave of the single phase AC supply voltage one of the switching elements may be actively controlled, while the antiparallel diode of the respective other switching element bridges the respective other switching element.

Therefore, the bidirectional switching elements may be used to controllably provide positive and negative current to the main winding of the single phase induction motor and to provide a respective freewheeling path.

In an embodiment, the control system may comprise a current sensor coupled to the control unit and configured to sense the input current to the single phase induction motor at the phase supply input. The control unit may be configured to drive the first bidirectional switching element and the second bidirectional switching element based on the sensed current.

The switching of the bidirectional switching elements may be adjusted to optimize the inrush current and the starting torque of the single phase induction motor. Since the inrush current should be limited, measuring the input current (i.e. the inrush current during start of the single phase induction motor) allows reacting to an increasing input current and limiting this current.

As already explained above, the bidirectional switching elements in conjunction with the main winding may be operated as buck converters for the positive half-wave and the negative half-wave of the single phase AC input voltage.

Therefore, the control unit may start operating the bidirectional switching elements as buck converters when the input current reaches a predetermined threshold value. It is understood, that the predetermined threshold value may define an absolute value that may be valid for the positive and the negative half-wave of the single phase AC input voltage.

This leads to three current regions. A center current region is the region for which the input current is below the predetermined threshold value. An upper current region is the region for which the input current is positive and the absolute value is above the threshold value. A lower region is the region for which the input current is negative and the absolute value is above the threshold value.

In an embodiment, the control unit may be configured to control the first bidirectional switching element and the second bidirectional switching element in an alternating manner based on a PWM scheme, wherein the control unit may be configured to determine the duty cycle for the PWM scheme based on the measured input current.

The factor between current increase on the output of a buck converter and the current reduction on the input of the buck converter is determined by the on-time or duty cycle of the switching of the first bidirectional switching element.

Therefore, in order to limit the inrush current to a predetermined level, the control unit needs to adapt the duty cycle for the switching of the first bidirectional switching element. Since the first and the second bidirectional switching element are switched alternatingly, the duty cycle $D_1$ of the first bidirectional switching element automatically determines the duty cycle $D_2$ of the second bidirectional switching element. The duty cycle $D_2$ of the second bidirectional switching element may be determined as $D_2=100\%-D_1$.

In an embodiment, the control unit may comprise an integral controller for determining the duty cycle based on a reference current value and based on the measured supply current.

A purely integral controller may be used to achieve a stable operation of the control system. The integral controller ensures that the PWM duty cycle does not change rapidly, therefore providing a smooth operation of the control system. This is especially beneficial to avoid the excitation of the LC input filter resonance frequency. The measured supply current of the control system may be used as control variable, since the aim of the control system is to limit the current drawn from the supply.

The absolute value of the instantaneous supply current may e.g. be compared to a reference current value. The difference between the measured input current absolute value and the reference current value, e.g. called error signal, may be fed into the integral controller. The integral controller may then adjust the duty cycle of the PWM switching of the first and second bidirectional switching elements.

In an embodiment, the control unit may comprise a reference value determination unit configured to determine the reference current value based on a fixed current value and a variable feedback current value, wherein the control unit may be configured to determine the variable feedback current value based on the current duty cycle.

The reference current value may be provided as a constant value. However, providing the reference current value as a variable value helps in "shaping" the current and provides a more sinusoidal supply current.

Therefore, the reference current value may be provided as the sum of a constant of fixed current value and a variable feedback value.

In a purely exemplary embodiment, the fixed current value may be 17 A, a factor for the integral controller may be 120 1/As.

The duty cycle will therefore be zero when the absolute value of the measured supply current is below the fixed current value. This is the operation in the central current region as explained above. When the duty cycle is zero, the reference current value equals the fixed current value, e.g. 17 A. Once the measured supply current exceeds the constant or fixed current value, the error signal increases and the integral controller will gradually increase the PWM duty cycle. Once the duty cycle increases, the variable reference current or variable feedback current increases proportionally. Thus, the final reference current value increases when there is an increase in the duty cycle. The controlled supply current will therefore follow the limit set by the fixed current value. The amplitude of the supply current will be gradually limited, thus providing a rather round shape of the supply current. This will produce less harmonics of the supply current and the main winding current. Further, torque pulsations will be reduced.

Generally, any of the embodiments described or options mentioned herein may be particularly advantageous depending on the actual conditions of application. Further, features of one embodiment may be combined with features of another embodiment as well as features known per se from the prior art as far as technically possible and unless indicated otherwise.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which:

FIG. 2 shows a flow diagram of an embodiment of a control method according to the present invention;

In the figures like reference signs denote like elements unless stated otherwise.

DETAILED DESCRIPTION OF THE DRAWINGS

Figure 1:
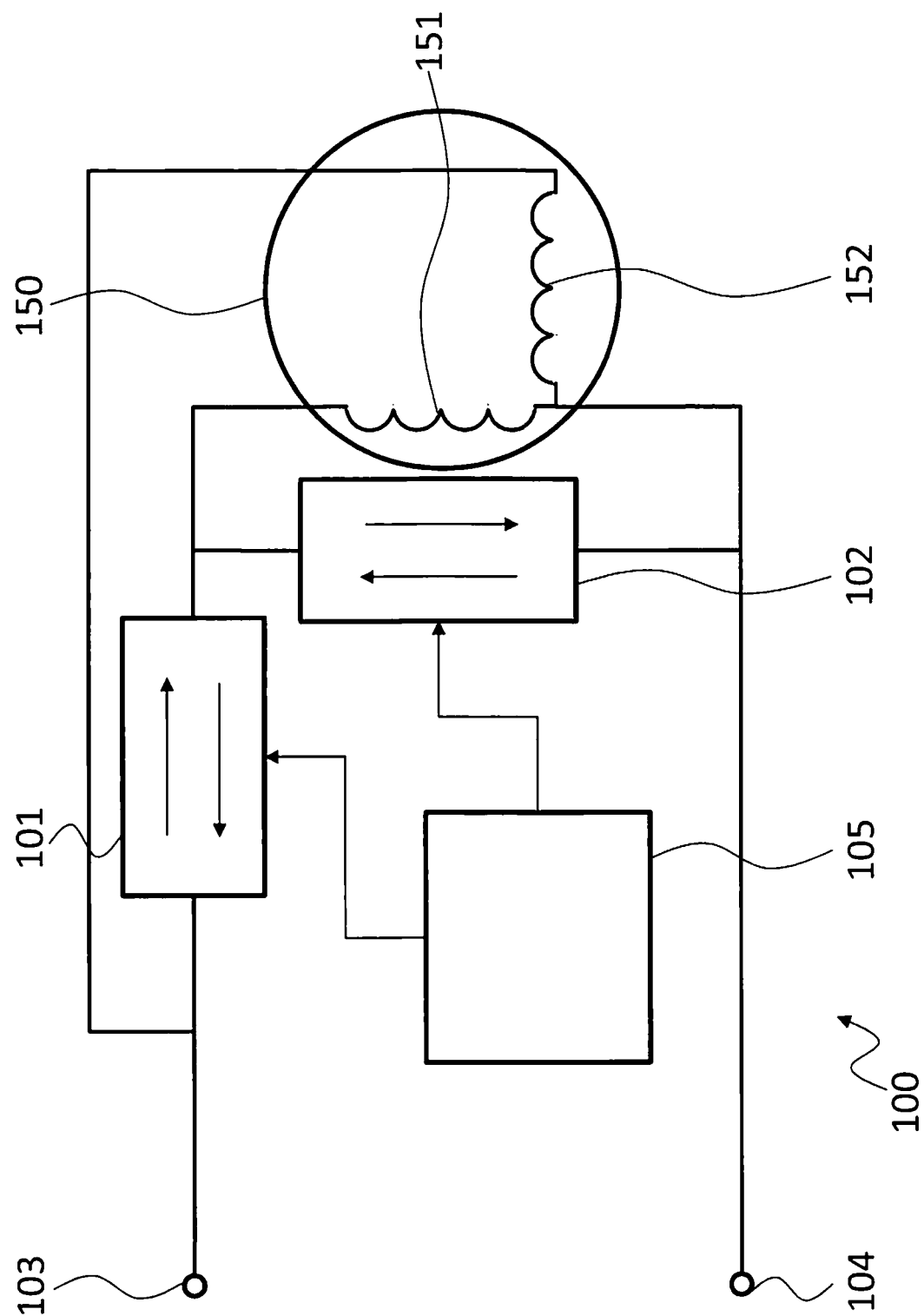
FIG. 1 shows a block diagram of an embodiment of a control system according to the present invention.

FIG. 1 shows a block diagram of an embodiment of a control system 100 for a single phase induction motor 150. The single phase induction motor 150 comprises a main winding 151 and an auxiliary winding 152. The single phase induction motor 150 is supplied with electrical energy via a single phase AC source, i.e. via an AC voltage. Such a voltage may for example comprise 230 V with a frequency of 50 Hz or 110 V with a frequency of 60 Hz. However, any other voltage level and frequency is also possible.

The control system 100 comprises a first bidirectional switching element 101 and a second bidirectional switching element 102. The first bidirectional switching element 101 is arranged between a phase supply input 103 of the single phase induction motor 150 and the main winding 151. The second bidirectional switching element 102 is arranged electrically in parallel to the main winding 151. The ends of the second bidirectional switching element 102 and the main winding 151 that are not coupled to the first bidirectional switching element 101 are coupled to a neutral input 104. A control unit 105 is provided that is coupled to the first bidirectional switching element 101 and the second bidirectional switching element 102 for controlling the first bidirectional switching element 101 and the second bidirectional switching element 102 during a start-up phase of the single phase induction motor 150.

The first bidirectional switching element 101 and the second bidirectional switching element 102 are switching elements that allow electrical current to flow in both directions, when they are actuated or controlled to be closed. This allows using the first bidirectional switching element 101 and the second bidirectional switching element 102 in AC applications, where the supply voltage comprises positive and negative voltage levels.

The control unit 105 that is coupled to the first bidirectional switching element 101 and the second bidirectional switching element 102 may e.g. be a microcontroller 105. It is understood, that any other type of control unit is also possible, such a control unit may comprise an ASIC, a FPGA, a CPLD or the like. The control unit 105 may comprise output ports that couple the control unit 105 to the first bidirectional switching element 101 and the second bidirectional switching element 102 to control the switching state of the first bidirectional switching element 101 and the second bidirectional switching element 102. Such outputs may e.g. be logic level outputs with voltage levels of 5 V, or e.g. 3.3 V. It is understood, that either the control unit 105 or the first bidirectional switching element 101 and the second bidirectional switching element 102 may comprise further circuitry, like e.g. resistors and transistors, that couples the control unit 105 to the first bidirectional switching element 101 and the second bidirectional switching element 102.

For operating the single phase induction motor 150 the single phase induction motor 150 is started in a startup phase until it reaches its operating conditions, i.e. its operating speed or revolutions. In this startup phase the single phase induction motor 150 usually causes a high inrush current that puts a high load on the mains supply network.

To lower the high inrush current, the control unit 105 may control the first bidirectional switching element 101 and the second bidirectional switching element 102 such that with the main winding 151 they form a type of buck-converter. This buck-converter will reduce the voltage over the main winding 151 and at the same time increase the current through the main winding 151 compared to the voltage and current at the phase supply input 103. With a respective control it is therefore possible to reduce or avoid the inrush current peaks and at the same time increase the current through the main winding 151 that is responsible for producing the starting torque in the single phase induction motor 150.

To this end, the control unit 105 may alternatingly control during a positive half-wave of the input voltage at the phase supply input 103 the first bidirectional switching element 101 to provide a positive current to the main winding 151 and the second bidirectional switching element 102 to provide a freewheeling current path for the positive current through the main winding 151. This means that while the first bidirectional switching element 101 is closed, the second bidirectional switching element 102 is opened, and vice versa.

During a negative half-wave of the input voltage at the phase supply input 103 the control unit 105 will control the first bidirectional switching element 101 to provide a negative current to the main winding 151, 251 and the second bidirectional switching element 102 to provide a freewheeling current path for the negative current through the main winding 151, 251. Again, this means that while the first bidirectional switching element 101 is closed, the second bidirectional switching element 102 is opened, and vice versa.

The amount of current increase and voltage decrease in the main winding 151 compared to the phase supply input 103 may be controlled by the control unit 105 through the switching times of the first bidirectional switching element 101 and the second bidirectional switching element 102. The control unit 105 may e.g. perform a PWM based switching of the first bidirectional switching element 101 and the second bidirectional switching element 102. A specific control scheme will be described with regard to FIG. 5.

After the single phase induction motor 150 reaches its operating conditions, i.e. after the startup phase, the control unit 105 may permanently open the first bidirectional switching element 101 and permanently close the second bidirectional switching element 102 for normal operation of the single phase induction motor 150. As may be seen in FIG. 3 a bypass for the first bidirectional switching element 101 is also possible.

For sake of clarity in the following description of the method based FIG. 2 the reference signs used in the description of the apparatus based figures will be maintained.

FIG. 2 shows a flow diagram of a control method for controlling a single phase induction motor 150, 250 with a main winding 151, 251, with an auxiliary winding 152, 252 and with a running capacitor arranged between a phase supply input 103, 203 and the auxiliary winding 152, 252.

The control method comprises providing S1 in an alternating manner a positive current to the main winding 151, 251 and a freewheeling current path for the positive current through the main winding 151, 251 during a positive half-wave of a supply voltage of the single phase induction motor 150, 250, and providing S2 in an alternating manner a negative current to the main winding 151, 251 and a freewheeling current path for the negative current through the main winding 151, 251 during a negative half-wave of a supply voltage of the single phase induction motor 150, 250.

Providing in an alternating manner a positive current to the main winding 151, 251 and a freewheeling current path for the positive current may e.g. be performed with two switching elements 210, 211 arranged in common emitter connection or common collector connection or with two parallel reverse blocking transistors. The same applies to providing in an alternating manner a negative current to the main winding 151, 251 and a freewheeling current path for the negative current. This may be performed with two switching elements 212, 213 arranged in common emitter connection or common collector connection or with two parallel reverse blocking transistors.

The control method may comprise sensing the input current to the single phase induction motor 150, 250 at the phase supply input 103, 203. Providing in an alternating manner a positive current to the main winding 151, 251 and a freewheeling current path for the positive current and providing in an alternating manner a negative current to the main winding 151, 251 and a freewheeling current path for the negative current may then be performed based on the sensed current.

Providing in an alternating manner a positive current to the main winding 151, 251 and a freewheeling current path for the positive current and providing in an alternating manner a negative current to the main winding 151, 251 and a freewheeling current path for the negative current may further be performed based on a PWM scheme. The PWM scheme may be based on the measured input current, wherein the duty cycle may be determined with an integral controller 320 based on a reference current value and based on the measured supply current. The reference current value may be determined based on a fixed current value and a variable feedback current value, wherein the variable feedback current value may be determined based on the current duty cycle.

The control method may further comprise filtering an input voltage between the phase supply input 103, 203 of the single phase induction motor 150, 250 and a neutral input 104, 204 of the single phase induction motor 150, 250.

Figure 3:
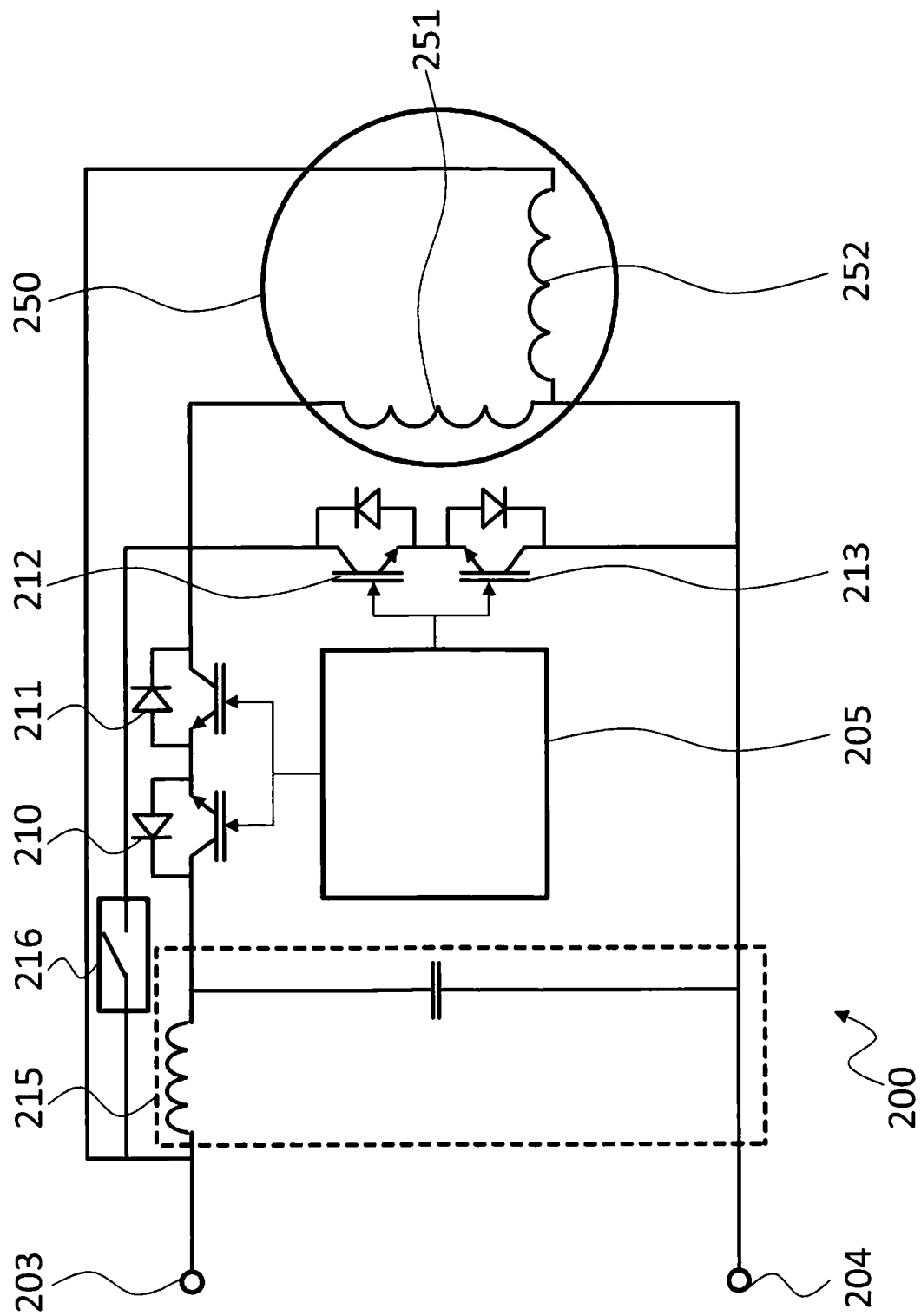
FIG. 3 shows a block diagram of another embodiment of a control system according to the present invention.

FIG. 3 shows a block diagram of another control system 200 for controlling a single phase induction motor 250. The single phase induction motor 250 also comprises a main winding 251 and an auxiliary winding 252. The control system 200 is based on the control system 100 and also comprises a control unit 205 that controls switching elements. However, in the control system 200 the first bidirectional switching element and the second bidirectional switching element are not specifically referenced. Instead, the first bidirectional switching element and the second bidirectional switching element are each represented by two MOSFET-Transistors 210, 211 and 212, 213 in common emitter configuration. A single MOSFET-Transistor is a directional switching element that allows switching a current from the source to the drain with a voltage at the gate that is positive regarding the voltage at the source of the transistor. Current in the other direction may flow via the inherent diode of the MOSFET. Therefore, by arranging two MOSFETs in series with reverse polarity it is possible to controllably switch currents in both directions.

It is understood, that instead of two MOSFETs in common emitter arrangement other arrangements may be provided. For example IGBTs may be used. Further, a common collector arrangement may be chosen. Further, reverse blocking transistors may be used in a parallel configuration. In addition, although only single MOSFETs 210, 211, 212, 213 are shown, it is understood that every one of the shown MOSFETs may be implemented as a parallel arrangement of two or more MOSFETs or IGBTs or other switching elements.

In the control system 200 the control unit 205 individually controls the single MOSFETs 210, 211, 212, 213. During a positive half-wave of the input voltage, the control unit 205 will alternatingly control the MOSFETs 210, 212. During a negative-half wave of the input voltage, the control unit 205 will alternatingly control the MOSFETs 211, 213.

The control system 200 also comprises a bypass switching element 216 that is arranged in parallel to the MOSFETs 210, 211. This bypass switching element 216 may be used to bypass the MOSFETs 210, 211 during a normal operation of the single phase induction motor 250.

In addition, the single phase induction motor 250 also comprises an input filter 215 that filters the input voltage and current between the phase supply input 203 and the MOSFETs 210, 211. It can be seen that the bypass switching element 216 also bypasses the input filter 215.

Figure 4:
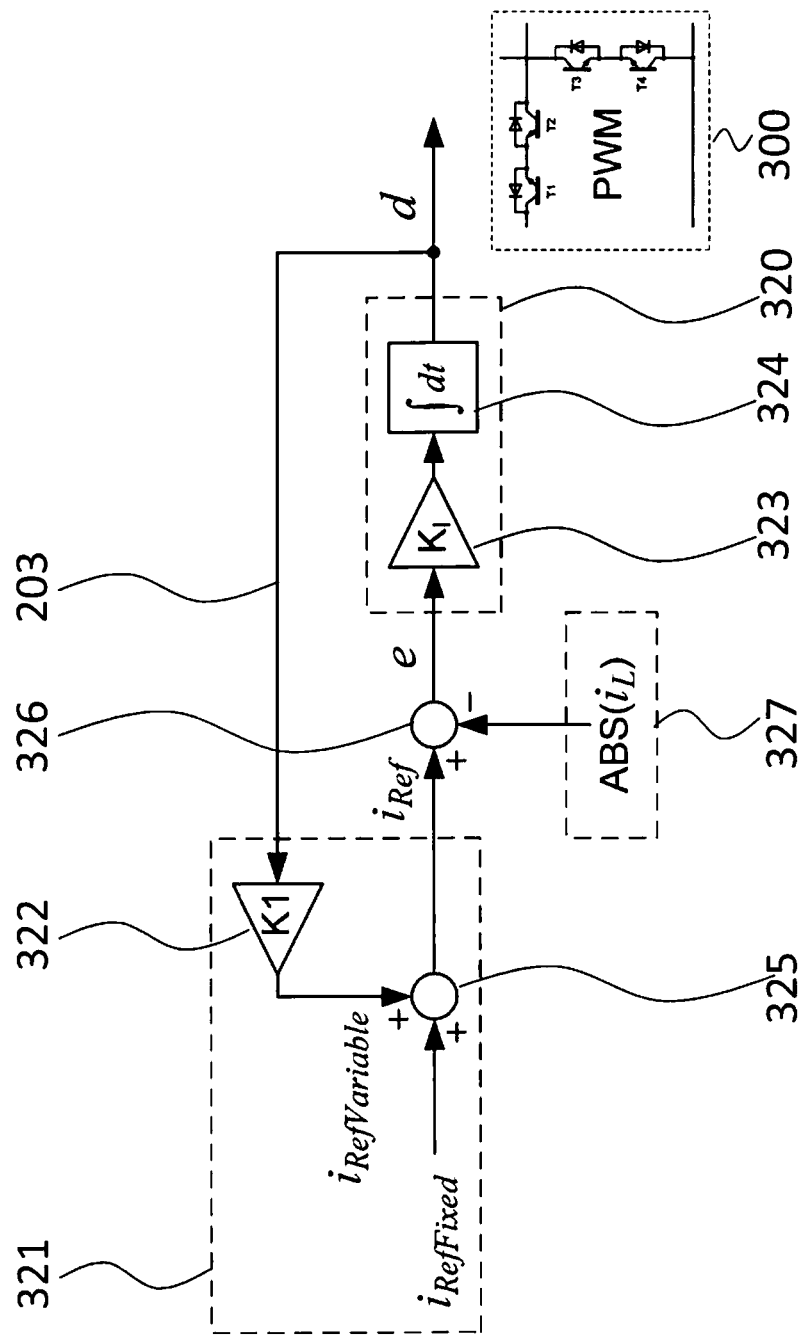
FIG. 4 shows a block diagram of a control algorithm for use with an embodiment of a control system according to the present invention.

FIG. 4 shows a block diagram of a control algorithm for use with a control system 300. The output of the control algorithm is a duty cycle d from integral controller 320, that may be used by the control unit 105, 205 to control the first bidirectional switching element 101 and the second bidirectional switching element 102, e.g. the MOSFETs 210, 211, 212, 213.

Integral controller 320 comprises a proportional element 323 that multiplies an input value with a proportionality factor $K_I$. An integral element 324 or integrator than integrates over time the output of proportional element 323 to generate the duty cycle d.

The input to integral controller 320 is generated from the difference of a reference current $i_{Ref}$ and an absolute value of a measured current $ABS(i_L)$, wherein $i_L$ is the current that flows into the single phase induction motor 150, 250 at the phase supply input 103, 203.

The reference current $i_{Ref}$ is generated in a feedback loop that receives the duty cycle d. A proportional element 322 then multiplies the duty cycle d with factor K1. The output of proportional element 322 is then added to a fixed reference current value $i_{RefFixed}$ to generate the reference current $i_{Ref}$.

Possible values for $i_{RefFixed}$, K1, and $K_i$ are:
$i_{RefFixed}$=17 A
K1=34 A
$K_i$=120 1/As It is however understood, that these values are just exemplary values and that the respective values for specific applications may be determined e.g. experimentally or by simulation.

Figure 5:
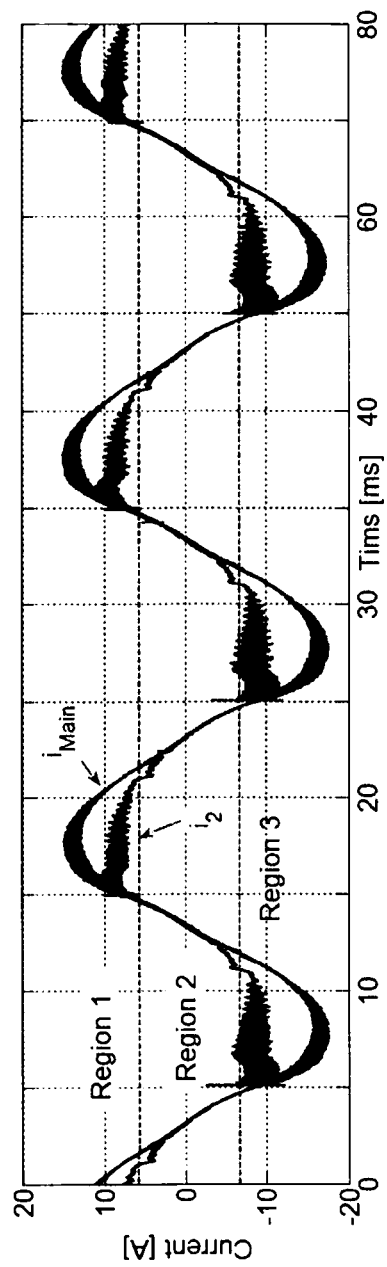
FIG. 5 shows a diagram of variables in an embodiment of a control system according to the present invention.

FIG. 5 shows a diagram of currents over time in a control system 100, 200, 300 according to the present invention.

In the diagram three regions are marked. The first region 1 comprises currents that are higher than 10 A. The second region 2 comprises currents between 10 A and −10 A. Finally, the third region 3 comprises currents that are lower than −10 A.

The currents shown are the current $i_{Main}$, i.e. the current through the main winding, and the current $i_2$, i.e. the current that flows into the input filter 215 of the control system 200.

In the diagram it can be seen, that the current $i_{Main}$ comprises a sinusoidal shape. This means that the main winding is supplied with a sinusoidal current. The current reaches levels in region 1 and region 3 that are over the limits of the second region 2.

In contrast, the current that flows into the input filter is controlled such that it stays within the limits of region 2.

It can be seen in the diagram of FIG. 5 that with the present invention the inrush current to the single phase induction motor may be limited, while at the same time driving the main winding with a full sinusoidal current.

Figure 6:
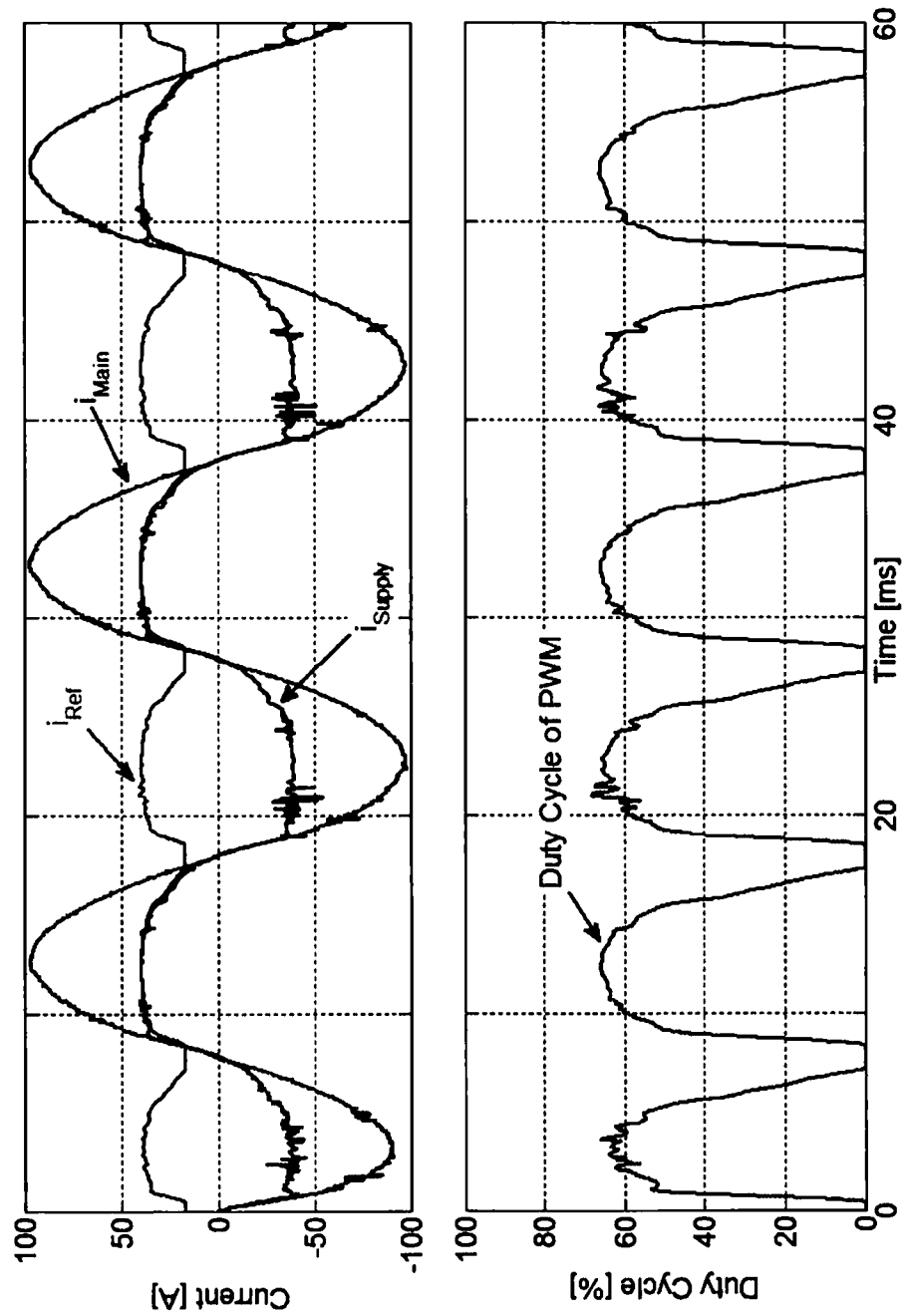
FIG. 6 shows another diagram of variables in an embodiment of a control system according to the present invention.

FIG. 6 shows a diagram of currents and a diagram of the duty cycle in a control system according to the present invention.

The current diagram shows the reference current $i_{Ref}$ the supply current $i_{supply}$, and the current in the main winding $i_{Main}$. The supply current $i_{supply}$ is the current that is measured as input value to the controller shown in FIG. 4 and may also be referenced as $i_L$.

The lower diagram shows the duty cycle that the controller of FIG. 4 generates for the respective currents as shown in the upper diagram.

According to the controller schematic as shown in FIG. 4 the duty cycle is zero, when the absolute value of the supply current $i_{supply}$ is lower than the fixed reference current value $i_{RefFixed}$. This is the operation in region 2 as shown in FIG. 5. When the duty cycle d is zero, the reference current $i_{Ref}$ equals the fixed reference current $i_{RefFixed}$, in this case exemplarily 17 A.

Once the supply current $i_{supply}$ exceeds the reference current $i_{Ref}$, the error signal in the controller increases and the integral controller will gradually increase the duty cycle. While the duty cycle increases, the variable reference current $i_{RefVariable}$ will increase proportionally and the value of $i_{Ref}$ will also increase. While the duty cycle increases, it can be seen that the supply current $i_{supply}$ follows the limit set by the reference current $i_{Ref}$. It can also be seen, that the amplitude of the current $i_{supply}$ is gradually limited, giving a rather round shape without sharp corners. This will produce less harmonics in the supply current $i_{supply}$ and will reduce the torque pulsations.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The present invention provides a control system (100, 200, 300) for controlling a single phase induction motor (150, 250) with a main winding (151, 251) and with an auxiliary winding (152, 252), the control system (100, 200, 300) comprising a first bidirectional switching element (101) and a second bidirectional switching element (102), wherein the first bidirectional switching element (101) is arranged between a phase supply input (103, 203) of the single phase induction motor (150, 250) and the main winding (151, 251) and wherein the second bidirectional switching element (102) is arranged electrically parallel to the main winding (151, 251), a control unit (105, 205) coupled to the first bidirectional switching element (101) and the second bidirectional switching element (102), wherein the control unit (105, 205) is configured to control in an alternating manner during a positive half-wave of a supply voltage of the single phase induction motor (150, 250) the first bidirectional switching element (101) to provide a positive current to the main winding (151, 251) and the second bidirectional switching element (102) to provide a freewheeling current path for the positive current through the main winding (151, 251), and wherein the control unit (105, 205) is configured to control in an alternating manner during a negative half-wave of a supply voltage of the single phase induction motor (150, 250) the first bidirectional switching element (101) to provide a negative current to the main winding (151, 251) and the second bidirectional switching element (102) to provide a freewheeling current path for the negative current through the main winding (151, 251). Further, the present invention provides a respective control method.

LIST OF REFERENCE SIGNS 100, 200, 300 control system
101 first bidirectional switching element
102 second bidirectional switching element
103, 203 phase supply input
104, 204 neutral input
105, 205 control unit
210, 211, 212, 213 switching element
215 input filter
216 bypass switching element
320 integral controller
321 reference value determination unit
322, 323 proportional element
324 integral element
325 summing point
326 difference point
327 measurement input
150, 250 single phase induction motor
151, 251 main winding
152, 252 auxiliary winding
S1, S2 method steps

The invention claimed is:

1. A control system for controlling a single phase induction motor with a main winding and with an auxiliary winding, the control system comprising:
  a first bidirectional switching element and a second bidirectional switching element,
  wherein the first bidirectional switching element is arranged between a phase supply input of the single phase induction motor and the main winding and wherein the second bidirectional switching element is arranged electrically parallel to the main winding,
  a controller coupled to the first bidirectional switching element and the second bidirectional switching element,
  wherein the controller is configured to control in an alternating manner, during a positive half-wave of a supply voltage of the single phase induction motor
  the first bidirectional switching element to provide a positive current to the main winding and
  the second bidirectional switching element to provide a freewheeling current path for the positive current through the main winding, and
  wherein the controller is configured to control in the alternating manner, during a negative half-wave of the supply voltage of the single phase induction motor
  the first bidirectional switching element to provide a negative current to the main winding and
  the second bidirectional switching element to provide the freewheeling current path for the negative current through the main winding,
  further comprising
  a current sensor coupled to the controller and configured to sense an input current to the single phase induction motor at the phase supply input, wherein the controller is configured to drive the first bidirectional switching element and the second bidirectional switching element based on the sensed current,
  wherein the controller is configured to control the first bidirectional switching element and the second bidirectional switching element in the alternating manner based on a PWM scheme, wherein the controller is configured to determine a duty cycle for the PWM scheme based on the input current,
  wherein the controller comprises an integral controller configured for determining the duty cycle based on a difference between a reference current value and the input current,
  wherein the controller comprises a reference value determination unit configured to determine the reference current value based on a fixed current value and a variable feedback current value, wherein the controller is configured to determine the variable feedback current value based on the duty cycle,
  wherein the reference value determination unit is configured to determine the reference current value by adding the fixed current value to the variable feedback current value.

2. The control system according to claim 1, comprising an input filter circuit arranged between the phase supply input of the single phase induction motor and a neutral input of the single phase induction motor.

3. The control system according to claim 1, comprising a bypass switching element arranged between the phase supply input and the main winding.

4. The control system according to claim 1, comprising a running capacitor arranged between the phase supply input and the auxiliary winding.

5. The control system according to claim 1,
wherein the first bidirectional switching element comprises two switching elements arranged in common emitter connection or common collector connection, and/or
wherein the second bidirectional switching element comprises two switching elements arranged in common emitter connection or common collector connection; and/or
wherein the first bidirectional switching element comprises two parallel reverse blocking transistors, and/or wherein the second bidirectional switching element comprises two parallel reverse blocking transistors.

6. The control system of claim 1, wherein the first bidirectional switching element comprises:
a first transistor comprising a first gate terminal connected to the controller, a second terminal connected to the phase supply input, and a third terminal;
a second transistor comprising a second gate terminal connected to the controller, a fourth terminal connected to the third terminal, and a fifth terminal connected to the main winding;
a first diode that is configured to allow positive current flow through the first diode from the third terminal to the second terminal; and
a second diode that is configured to allow positive current flow through the second diode from the fourth terminal to the fifth terminal.

7. The control system of claim 1, further comprising a switch, wherein the second bidirectional switching element comprises:
a first transistor comprising a first gate terminal connected to the controller, a second terminal connected to the phase supply input via the switch, and a third terminal;
a second transistor comprising a second gate terminal connected to the controller, a fourth terminal connected to the third terminal, and a fifth terminal connected to the main winding;
a first diode that is configured to allow positive current flow through the first diode from the third terminal to the second terminal; and
a second diode that is configured to allow positive current flow through the second diode from the fourth terminal to the fifth terminal.

8. The control system of claim 1, wherein the variable feedback current value is proportional to the duty cycle.

9. The control system of claim 1, wherein the integral controller is configured for determining the duty cycle by integrating over time a multiplicative product of (a) the difference between the reference current value and the input current and (b) a proportionality factor.

10. A control method for controlling a single phase induction motor with a main winding, with an auxiliary winding and with a running capacitor arranged between a phase supply input and the auxiliary winding, the control method comprising:
providing in an alternating manner a positive current to the main winding and a freewheeling current path for the positive current through the main winding during a positive half-wave of a supply voltage of the single phase induction motor, and
providing in the alternating manner a negative current to the main winding and the freewheeling current path for the negative current through the main winding during a negative half-wave of the supply voltage of the single phase induction motor,
further comprising
sensing an input current to the single phase induction motor at the phase supply input, wherein providing in the alternating manner the positive current to the main winding and the freewheeling current path for the positive current and providing in the alternating manner the negative current to the main winding and the freewheeling current path for the negative current is performed based on the input current,
wherein providing in the alternating manner the positive current to the main winding and the freewheeling current path for the positive current and providing in the alternating manner the negative current to the main winding and the freewheeling current path for the negative current is performed based on a PWM scheme, wherein the PWM scheme is based on the input current, especially, wherein a duty cycle is determined with an integral controller based on a difference between a reference current value and the input current, and
comprising determining the reference current value based on a fixed current value and a variable feedback current value, wherein the variable feedback current value is determined based on the duty cycle,
wherein determining the reference current value comprises determining the reference current value by adding the fixed current value to the variable feedback current value.

11. The control method according to claim 10, comprising filtering an input voltage between the phase supply input of the single phase induction motor and a neutral input of the single phase induction motor.

12. The control method according to claim 10,
wherein providing in the alternating manner the positive current to the main winding and the freewheeling current path for the positive current is performed with two switching elements arranged in common emitter connection or common collector connection or with two parallel reverse blocking transistors, and/or
wherein providing in the alternating manner the negative current to the main winding and the freewheeling current path for the negative current is performed with two switching elements arranged in common emitter connection or common collector connection or with two parallel reverse blocking transistors.

13. The control method of claim 10, wherein the variable feedback current value is proportional to the duty cycle.

14. The control method of claim 10, wherein determining the duty cycle comprises integrating over time a multiplicative product of (a) the difference between the reference current value and the input current and (b) a proportionality factor.

* * * * *